(12) United States Patent
Chu

(10) Patent No.: US 6,924,020 B2
(45) Date of Patent: Aug. 2, 2005

(54) OPTICAL DISK SUBSTRATE, OPTICAL DISK, AND METHOD OF FORMING THE SAME

(75) Inventor: Yi-Lin Chu, Hsinchu (TW)

(73) Assignees: Princo Corp., Hsinchu (TW); Princo America Corp., Fremont, CA (US)

( * ) Notice: Subject to any disclaimer, the term of this patent is extended or adjusted under 35 U.S.C. 154(b) by 0 days.

(21) Appl. No.: 10/651,826

(22) Filed: Aug. 29, 2003

(65) Prior Publication Data

US 2004/0209033 A1 Oct. 21, 2004

(30) Foreign Application Priority Data

Apr. 17, 2003 (TW) ........................................ 92109188 A

(51) Int. Cl.[7] .................................................. B32B 3/02
(52) U.S. Cl. .................... 428/64.1; 428/64.4; 428/64.5; 430/270.13
(58) Field of Search ............................. 428/64.1, 64.4, 428/64.5, 64.6, 913; 430/270.13

(56) References Cited

U.S. PATENT DOCUMENTS

| | | | | |
|---|---|---|---|---|
| 6,011,771 A | * | 1/2000 | Akama et al. | 720/711 |
| 6,195,234 B1 | * | 2/2001 | Sundaram et al. | 360/135 |
| 6,214,430 B1 | * | 4/2001 | Kim et al. | 428/64.1 |
| 6,495,235 B2 | * | 12/2002 | Uchida et al. | 428/64.1 |
| 6,704,275 B2 | * | 3/2004 | Netsu et al. | 720/721 |
| 2003/0161255 A1 | * | 8/2003 | Kikuchi et al. | 369/280 |

* cited by examiner

*Primary Examiner*—ELizabeth Mulvaney
(74) *Attorney, Agent, or Firm*—Law Offices of David Pai; Chao-Chang David Pai

(57) ABSTRACT

An optical disk substrate with a central hole is disclosed in the invention. The optical disk substrate includes: a first annular area for clamping, which surrounds the outer edge of the central hole and includes a first upper surface and a first lower surface thereon; and a second annular area for forming an information storing area, which surrounds the outer edge of the first annular area and includes a second upper surface and a second lower surface thereon; besides, the first lower surface and the second lower surface are on the same plane, whereas the first upper surface is higher than the second upper surface. Moreover, an optical disk that applies the optical disk substrate and a method for forming the optical disk are also disclosed in the invention.

13 Claims, 7 Drawing Sheets

OPTICAL DISK SUBSTRATE, OPTICAL DISK, AND METHOD OF FORMING THE SAME

BACKGROUND OF THE INVENTION

1. Field of the Invention

The invention relates to a substrate and, more particularly, to a substrate that is applied to an optical disk.

2. Description of the Related Art

An optical disk can store data in different formats, such as image data, digital image data files, and text files; therefore, an optical disk is the most convenient storage medium among the new generation optical storage media. In addition, the scope of fields that an optical disk can be applied to is very broad, including library archives, data backup, electronic publication, image data storage, and personal medical record management.

The structure of a conventional optical disk substrate 500 is shown in FIG. 5(a), which shows a side view of a conventional optical disk substrate. Herein, a DVD-R optical disk, which is a type of DVD optical disks, is taken as an example and shown in FIG. 5(a). The optical disk substrate 500 has a transparent base plate 501 capable of stacking a recording layer 502, a reflection layer 503, and a protection layer 504, in this order, over the transparent base plate 501 in sequence. On the other hand, FIG. 5(b) is a top view of a conventional optical disk substrate 500. As shown in FIG. 5(b), a clamping area 506 used for clamping is provided around the outer edge of a central hole 505, and an annular information storing area 507 is provided around the outer edge of the clamping area 506. In addition, the diameter of the optical disk substrate 500 is 120 mm, the diameter of the central hole is about 15 mm, and the outer diameter of the clamping area is about 15.5~48 mm.

Also, referring to FIG. 6, which is a side view of a conventional optical disk 50, the specified thickness of the optical disk substrate 500 is 0.6 mm. Additionally, the optical disk 50 normally also includes a compensation sheet 600, whose dimension is the same as that of the optical disk substrate 500, namely 120 mm. Besides, a central hole is also provided thereon with a diameter of 15 mm. Since the thickness of the compensation sheet 600 is 0.6 mm, adding this thickness to that of the optical disk substrate 500 makes a finished optical disk 1.2 mm in thickness. Therefore, the strength of the optical disk can be enhanced so that when the optical disk is revolving in the optical disk drive, the optical disk will not be distorted due to high-speed revolution and thus may avoid a reading problem on the disk drive.

Next, FIG. 7 is a schematic view of an optical disk being placed in an optical disk drive. As shown in FIG. 7, when a disk drive is reading from an optical disk 50, the disk drive of the drive device utilizes a disk chuck 701 to clamp on the clamping area 506 of the optical disk 50. Therefore, the optical disk 50 will be clamped between the disk chuck 701 and the disk turntable 702 and driven by a disk turntable driving motor (not shown) to revolve together with the disk chuck 701 and the disk turntable 702. Moreover, the distance (d) between the laser reading head 703 and the optical disk substrate 500 will be kept unchanged so that the laser of the optical disk drive can be reflected back by the reflection layer 503 of the optical disk substrate 500 and thus information in the optical disk 50 can be read out.

However, during the process of fabricating the optical disk, an extra step will be required for pressing or bonding the compensation sheet 600 to the optical disk substrate 500. Unfortunately, not only will this extra step reduce the yield of optical disk substrate, but the quality of optical disk can also decline. Moreover, in order to fabricate the compensation sheet 600, extra injection molding apparatuses might be needed, and this extra requirement will certainly increase time and cost for fabrication tremendously.

BRIEF SUMMARY OF THE INVENTION

Focusing on the aforementioned problem, the main and first object of the invention is to provide an optical disk substrate and an optical disk, wherein the optical disk requires no compensation sheet of the same size as the optical disk substrate, but the optical disk can still maintain a planar shape when revolving in a disk drive without being slanted or distorted so that the disk drive can read digital data correctly from the optical disk.

The second object of the invention is to provide a method for fabricating an optical disk substrate, which can increase the yield while maintaining the same quality of the optical disk as expected.

The third object of the invention is to provide a method for fabricating an optical disk substrate so that the need for extra apparatuses for production can be reduced and the time and cost needed for fabricating the optical disk can be reduced as well.

To achieve the aforementioned objects, the optical disk substrate with a central hole of the invention includes, a first annular area for clamping, which surrounds the outer edge of the central hole and includes a first upper surface and a first lower surface thereon; and a second annular area for forming an information storing area, which surrounds the outer edge of the first annular area and includes a second upper surface and a second lower surface thereon; besides, the first lower surface and the second lower surface are on the same plane, whereas the first upper surface is higher than the second upper surface.

In the invention, a method for fabricating the optical disk substrate is also disclosed, wherein the optical disk substrate is fabricated by injection molding so that the optical disk substrate can be integrally formed with a thicker center but thinner periphery.

Also, the method for fabricating the optical disk substrate includes the following steps: first is to form a base plate having a third area and a fourth area, wherein the third area and the fourth area have the same thickness; next is to form a compensation sheet, wherein the dimension of the compensation sheet is the same as that of the third area; and finally is to assemble the base plate and the compensation sheet for forming the optical disk substrate.

Furthermore, according to the optical disk substrate, optical disk, and method of forming the same of the invention, the thickness of the area of the optical disk to be clamped on by the disk chuck of the optical disk drive is the same as the thickness of a conventional optical disk. Therefore, when the optical disk is placed in the optical disk drive and is revolving in the disk drive, it can still maintain a planar shape without being distorted or slanted. Also, the distance between the laser reading head of the disk drive and the optical disk substrate will remain the same. Therefore, the laser of the disk drive can be reflected back by the reflection layer of the optical disk substrate and thus information in the optical disk can be read out in the same way as for a conventional optical disk. Moreover, since the information storing area of the optical disk substrate will not be influenced, the quality of the optical disk can be enhanced, and the yield can be increased as well. In addition, because the volume of the optical disk can be largely reduced, the materials used and the production costs can thus be reduced.

DETAILED DESCRIPTION OF THE INVENTION

Figure 1A:
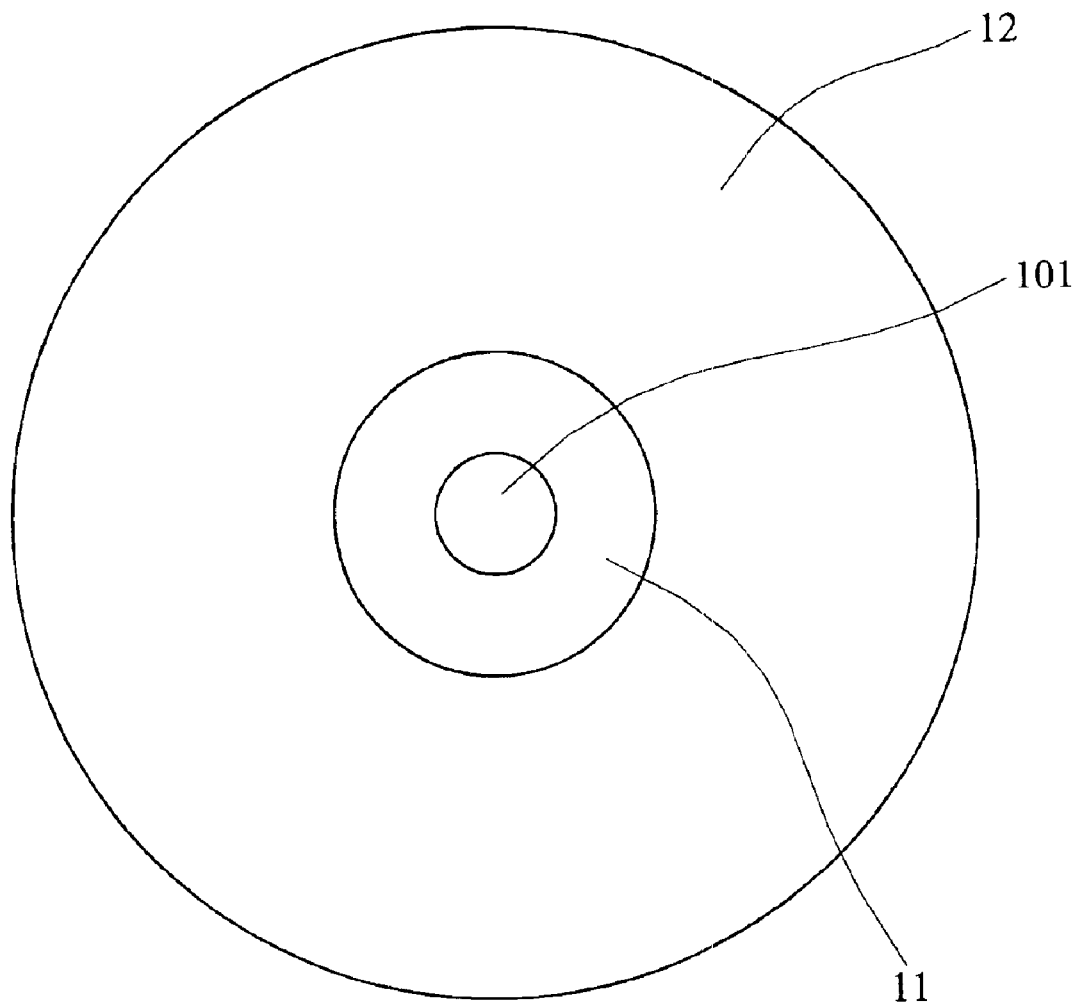
FIG. 1(a) is a top view of an optical disk substrate.

The optical disk substrate, optical disk, and method of forming the same according to the embodiment of the invention will be described below with reference to the drawings, wherein the same components will be explained by the same reference numerals.

Figure 1B:
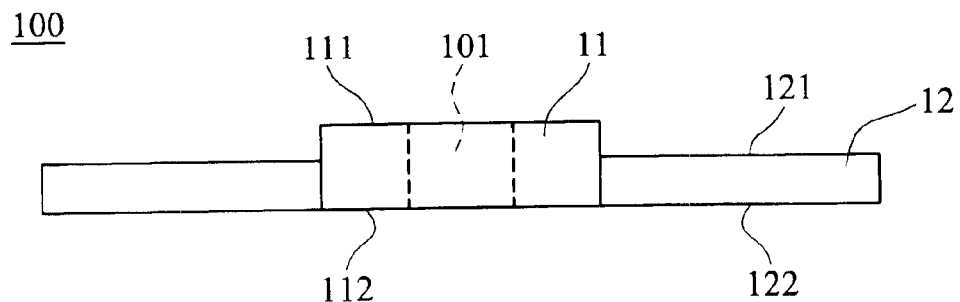
FIG. 1(b) is a side view of an optical disk substrate.

FIG. 1(a) is a top view of an optical disk substrate 100, and FIG. 1(b) is a side view of an optical disk substrate 100. The optical disk substrate 100 with a central hole 101 includes: a first annular area 11 for clamping, which surrounds the outer edge of the central hole 101 and includes a first upper surface 111 and a first lower surface 112 thereon; and a second annular area 12 for forming an information storing area, which surrounds the outer edge of the first annular area 11 and includes a second upper surface 121 and a second lower surface 122 thereon; besides, the first lower surface 112 and the second lower surface 122 are on the same plane, whereas the first upper surface 111 is higher than the second upper surface 121.

The thickness of the second annular area 12 of the optical disk substrate 100 is only 0.6 mm, while the thickness of the first annular area 11 is between 0.65 mm and 1.6 mm. Therefore, the optical disk substrate 100 of the invention has a structure that is higher in its center but lower in its periphery. In addition, the diameter of the optical disk substrate 100 is 120 mm, while the outer diameter of the first annular area 11 is between 15.5 mm and 48 mm.

Figure 1C:
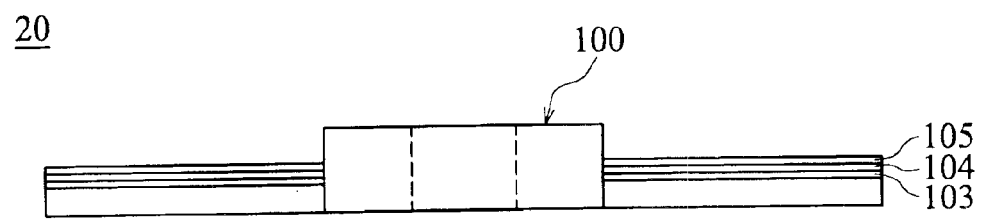
FIG. 1(c) is a side view of a DVD-R optical disk that applies the optical disk substrate of the invention.

FIG. 1(c) is a side view of a DVD-R optical disk 20 that applies the optical disk substrate 100 of the invention. As shown in FIG. 1(c), the second annular area 12 of the optical disk 20 further includes a recording layer 103, a reflection layer 104, and a protection layer 105. Also, the recording layer 103 composed of dyestuff is located on top of the second upper surface 121, the reflection layer 104 composed of metal is located on top of the recording layer 103, and the protection layer 105 is located on top of the reflection layer 104.

In general, the aforementioned optical disk substrate 100 can be applied to different optical disks. And, its recording layer is not limited to one layer; that is, the optical disk substrate 100 can be applied to an optical disk with multiple recording layers.

Figure 1D:
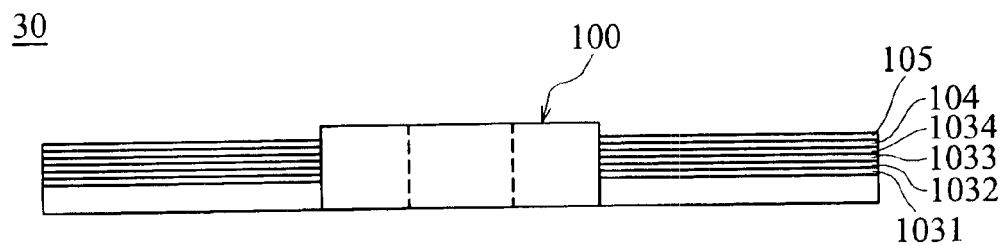
FIG. 1(d) is a side view of a phase change optical disk that applies the optical disk substrate of the invention.

Moreover, FIG. 1(d) is a side view of a phase change optical disk 30 that applies the optical disk substrate 100 of the invention. The phase change optical disk 30 includes: a first dielectric layer 1031, a recording layer 1032, a second dielectric layer 1033, a heat dissipating layer 1034, a reflection layer 104, and a protection layer 105. In the following, the location of each layer will be described starting from the bottom layer up to the top layer. First, the first dielectric layer 1031 composed of low dielectric constant material is located on top of the second upper surface 121 of the second annular area 12. Second, the recording layer 1032 composed of alloy is located on top of the first dielectric layer 1031. Third, the second dielectric layer 1033 composed of low dielectric constant material is located on top of the recording layer 1032. Fourth, the heat dissipating layer 1034 composed of metal is located on top of the second dielectric layer 1033. Fifth, the reflection layer 104 composed of metal is located on top of the heat dissipating layer 1034. Finally, the protection layer 105 is located on top of the reflection layer 104.

Figure 2:
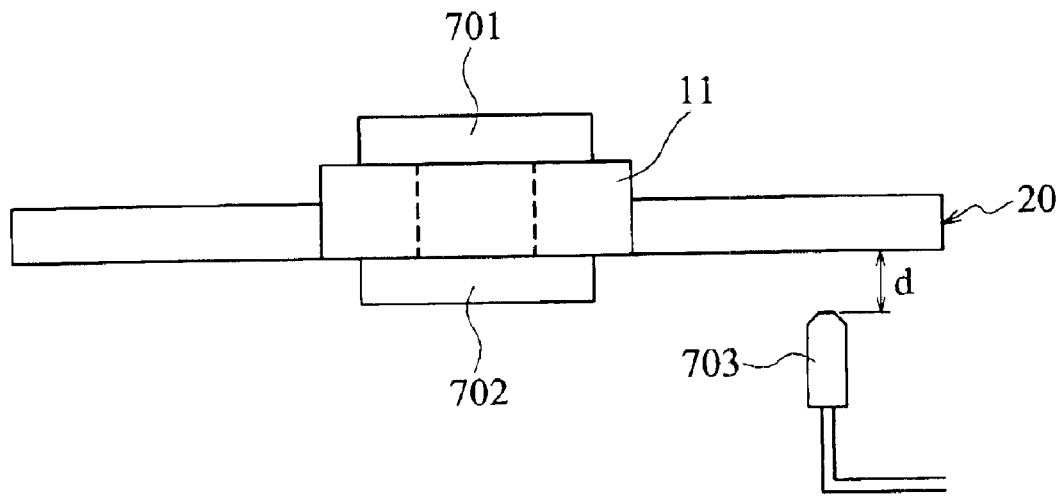
FIG. 2 is a schematic view showing an optical disk with its optical disk substrate placed inside an optical disk drive.

Next, FIG. 2 is a schematic diagram showing that an optical disk 20 with the optical disk substrate 100 is placed inside of an optical disk drive. Referring to FIG. 2, when a disk drive is reading from an optical disk 20, the disk drive uses a disk chuck 701 to clamp on the first annular area 11 of the optical disk 20. Therefore, the optical disk 20 will be clamped on between the disk chuck 701 and the disk turntable 702 and driven by a disk turntable driving motor (not shown) to revolve together with the disk chuck 701 and the disk turntable 702.

Also, it can be understood from FIG. 2 that since the disk chuck 701 of the disk drive is to clamp the optical disk on the first annular area 11, which has the same thickness as that of the clamping area of a conventional optical disk, the optical disk can still maintain a planar shape while revolving in the disk drive without being distorted or slanted. In addition, the distance (d) between the laser reading head 703 and the optical disk 20 will be kept unchanged so that when the laser of the optical disk drive is reflected back by the reflection layer 104 of the optical disk 20, the reflected result is still the same as that in a conventional optical disk, which means exactly the same information can be read out.

Figure 3A:
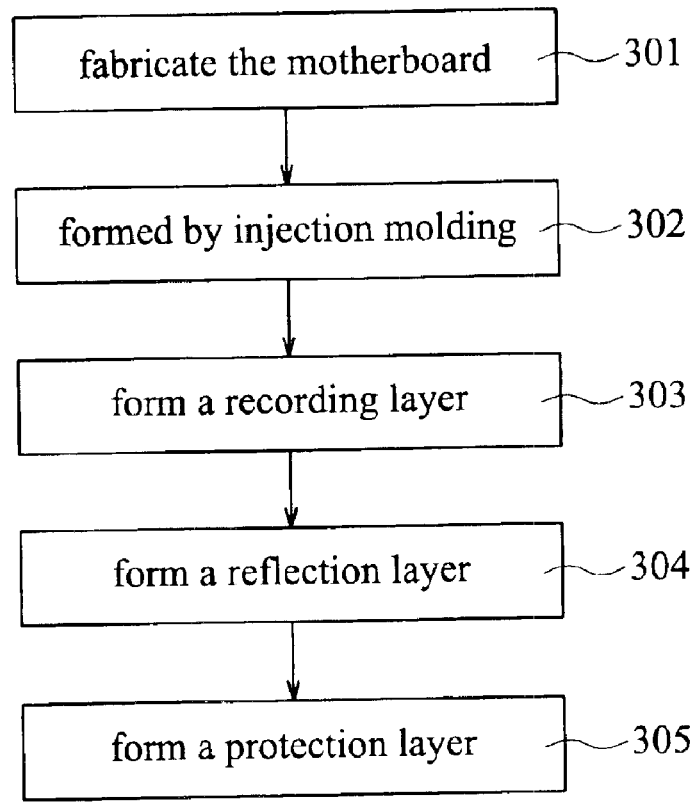
FIG. 3(a) is a flow chart showing how the optical disk substrate of the invention is applied to the fabrication of DVD-R optical disk.

Furthermore, FIG. 3(a) is a flow chart showing how the optical disk substrate 100 of the invention is applied in the fabrication of DVD-R optical disk. The procedure includes step 301 for fabricating a motherboard, step 302 for injection molding, step 303 for forming recording layer, step 304 for forming reflection layer, and step 305 for forming protection layer.

Figure 3B:
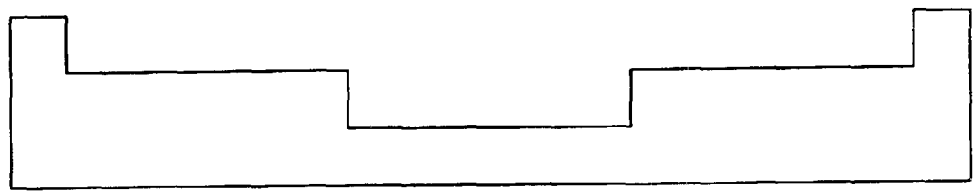
FIG. 3(b) is a schematic view showing how the optical disk substrate of the invention is applied to the fabrication of DVD-R optical disk.
Figure 3B:
Figure 3B:
Figure 3B:
Figure 3B:
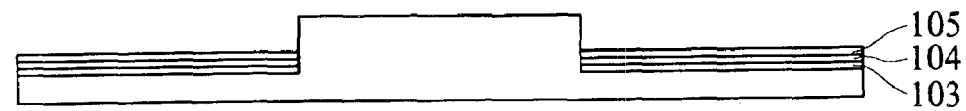

FIG. 3(b) is a schematic view showing how the optical disk substrate 100 of the invention is applied in the fabrication of DVD-R optical disk. The injection molding method applied in the fabrication is to inject melting resin under high pressure into a motherboard through an injection molding machine and then solidify the resin into an optical disk substrate 100. To illustrate the fabricating process, a conventional DVD-R optical disk fabricating process will be taken as an example. First, dyestuff or phase change material can be applied onto the second annular area 12 to form a recording layer 103. Next, aluminum, silver, or alloy of the both will be coated on the recording layer 103 by a plating apparatus to form a reflection layer 104. Specifically, the reflection layer 104 to be sputtered on the optical disk will play a key role in reading data. However, the reflection layer 104 is very liable to be scraped, peeled, or oxidized. Therefore, the protection layer 105 should be formed on top of the reflection layer 104 for protection. After the reflection layer 104 has been coated with protecting glue, ultraviolet ray will be radiated on the glue to make it dry and then the protecting glue forms a thin protection film. Thus, a DVD-R optical disk ready to be used in a disk drive is completed.

Similarly, the steps for fabricating an optical disk substrate 100 when applied to a phase change optical disk include: a motherboard fabricating step, injection molding step, first dielectric layer forming step, recording layer forming step, second dielectric layer forming step, heat dissipating layer forming step, reflection layer forming step, and protection layer forming step. Through all these steps, a phase change optical disk ready to be used in a disk drive can then be finished.

Figure 4A:
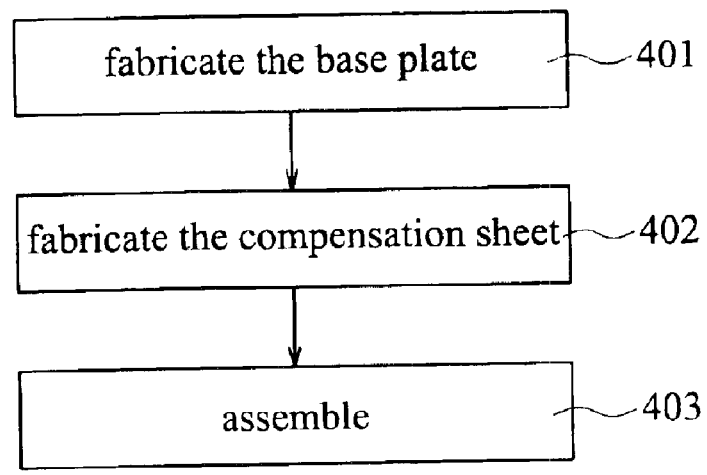
FIG. 4(a) is a flow chart showing another method for fabricating the optical disk substrate.
Figure 4B:
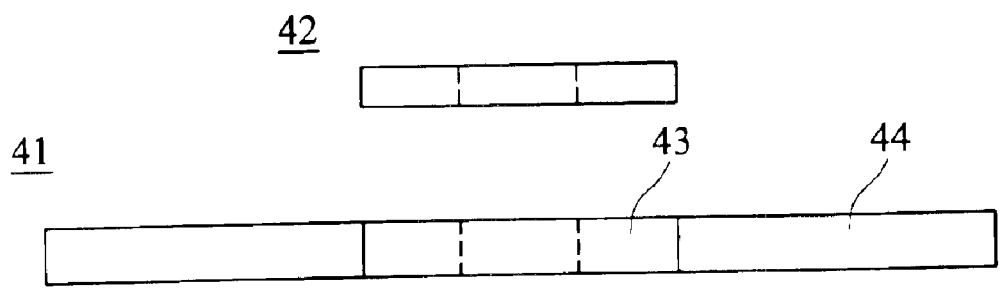
FIG. 4(b) is a schematic view showing another method for fabricating the optical disk substrate.
Figure 4B:
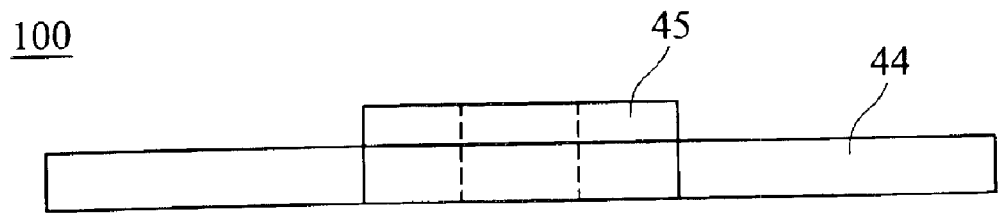
Figure 5A:
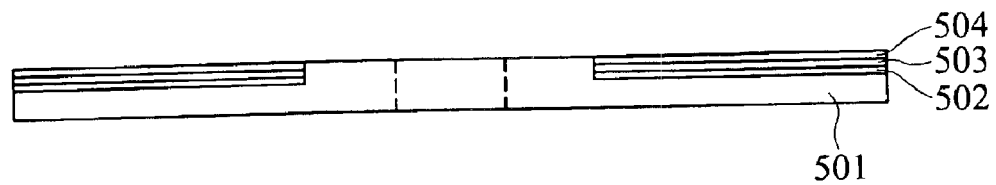
FIG. 5(a) is a side view of a conventional optical disk substrate.
Figure 5B:
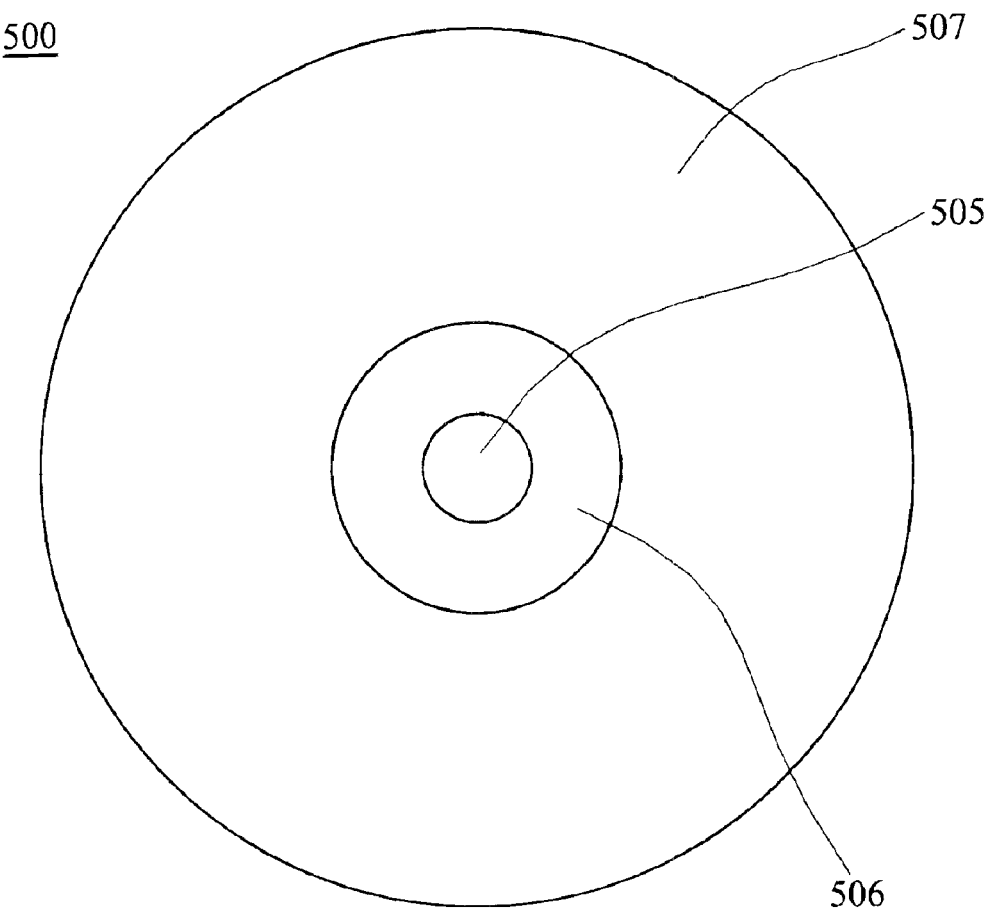
FIG. 5(b) is a top view of a conventional optical disk substrate.
Figure 6:
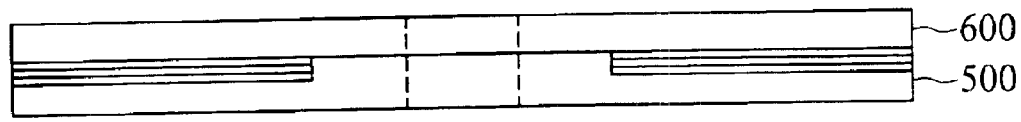
FIG. 6 is a side view of a conventional optical disk.
Figure 7:
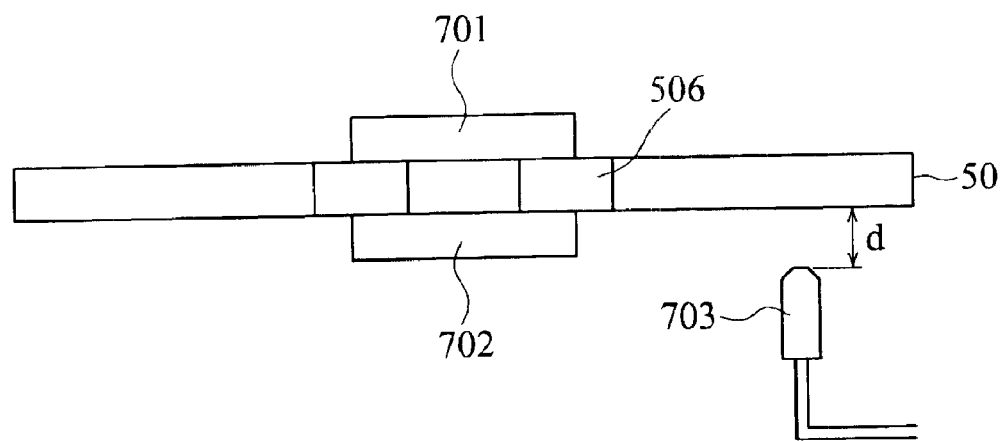
FIG. 7 is a schematic view showing a conventional optical disk placed inside an optical disk drive.

Finally, according to the invention, another method for fabricating the optical disk substrate 100 will be described below. As shown in FIGS. 4(a) & 4(b), the fabricating steps include: step 401 for fabricating the base plate 41, step 402 for fabricating the compensation sheet 42, and step 403 for assembling the base plate 41 and the compensation sheet 42. Specifically, the base plate 41 has a third area 43 and a fourth area 44, wherein the third area 43 and the fourth area 44 have the same thickness, and the fourth area 44 is for forming data recording area. The dimension of the compensation sheet 42 is the same as that of the third area 43. Besides, the assembling step 403 is to attach the compensation sheet 42, by pressing or bonding, onto the third area 43 of the base plate 41 so that the thickness after assembly can be between 0.65 mm and 1.6 mm.

The embodiments above are only intended to illustrate the invention; they do not, however, limit the invention to the specific embodiments. Anyone skilled in the art may, based on the aforementioned embodiments of the invention, proceed with modifications of equal effects without departing from its original spirit and scope of the invention. For instance, the optical disk substrate of the invention can be applied to various optical disks that require the same size of compensation sheet to be attached to them, such as DVD-Video, DVD-ROM, DVD-RW, DVD+RW, DVD+R, and DVD-RAM. Therefore, various modifications and changes of equal effects may be made without departing from the spirit and scope of the invention as described in the appended claims.

What is claimed is:

1. An optical disk substrate, which has a central hole, comprising:
   a first annular area for clamping, surrounding the outer edge of the central hole and including a first upper surface and a first lower surface thereon; and
   a second annular area for forming an information storing area, surrounding the outer edge of the first annular area and including a second upper surface and a second lower surface thereon;
   the first lower surface and the second lower surface being on the same plane, and the first upper surface being higher than the second upper surface;
   wherein the optical disk substrate is formed by applying injection molding method.

2. The optical disk substrate as claimed in claim 1, wherein
   the thickness of the first annular area is between 0.65 mm and 1.6 mm and its outer diameter is between 15.5 mm and 48 mm; and
   the thickness of the second annular area is around 0.6 mm and its outer diameter is around 120 mm.

3. An optical disk, comprising:
   an optical disk substrate with a central hole formed by applying injection molding method, which includes:
      a first annular area for clamping, surrounding the outer edge of the central hole and including a first upper surface and a first lower surface thereon; and
      a second annular area, surrounding the outer edge of the first annular area and including a second upper surface and a second lower surface thereon;
      the first lower surface and the second lower surface being on the same plane, and the first upper surface being higher than the second upper surface; and
   an information storing area, located on top of the second upper surface of the second annular area.

4. The optical disk as claimed in claim 3, wherein the information storing area includes:
   at least one recording layer, located on top of the second upper surface of the second annular area;
   a reflection layer, located on top of the at least one recording layer; and
   a protection layer, located on top of the reflection layer.

5. The optical disk as claimed in claim 4, wherein the at least one recording layer is composed of dyestuff; and
   the reflection layer is composed of metal.

6. The optical disk as claimed in claim 3, wherein the information storing area includes:
   a first dielectric layer, located on top of the second upper surface of the second annular area;
   a recording layer, located on top of the first dielectric layer;
   a second dielectric layer, located on top of the recording layer;
   a heat dissipating layer, located on lop of the second dielectric layer;
   a reflection layer, located on top of the heat dissipating layer; and
   a protection layer, located on top of the reflection layer.

7. The optical disk as claimed in claim 6, wherein
   the first dielectric layer and the second dielectric layer are composed of low dielectric constant material;
   the recording layer is composed of alloy;
   the heat dissipating layer is composed of metal; and
   the reflection layer is composed of metal.

8. A method for fabricating an optical disk substrate, comprising the following steps:
   fabricating a base plate having a third area and a fourth area, wherein the third area and the fourth area have the same thickness;
   fabricating a compensation sheet, wherein the dimension of the compensating sheet is the same as that of the third area; and
   assembling the compensation sheet and the base plate by joining the compensation sheet to the third area of the base plate.

9. The method for fabricating an optical disk substrate as claimed in claim 8, wherein the assembling step is achieved by bonding.

10. The method for fabricating an optical disk substrate as claimed in claim 8, wherein the assembling step is achieved by pressing.

11. A method for fabricating an optical disk, comprising the following steps:

fabricating an optical disk substrate with a central hole by applying injection molding method, wherein the optical disk substrate includes:

a first annular area for clamping, surrounding the outer edge of the central hole and including a first upper surface and a first lower surface thereon; and a second annular area, surrounding the outer edge of the first annular area and including a second upper surface and a second lower surface thereon;

the first lower surface and the second lower surface being on the same plane, and the first upper surface being higher than the second upper surface; and forming an information storing area on top of the second upper surface of the second annular area.

12. The method for fabricating an optical disk as claimed in claim 11, wherein the information storing area forming step comprises:

forming at least one recording layer on top of the second upper surface of the second annular area;

forming a reflection layer on top of the at least one recording layer; and forming a protection layer on top of the reflection layer.

13. The method for fabricating an optical disk as claimed in claim 11, wherein the information storing area forming step comprises:

forming a first dielectric layer on top of the second upper surface of the second annular area;

forming a recording layer on top of the first dielectric layer;

forming a second dielectric layer on top of the recording layer;

forming a heat dissipating layer on top of the second dielectric layer;

forming a reflection layer on top of the heat dissipating layer; and forming a protection layer on top of the reflection layer.

* * * * *